US012571357B1

(12) United States Patent
Anthony

(10) Patent No.: US 12,571,357 B1
(45) Date of Patent: Mar. 10, 2026

(54) THERMO-MAGNETIC MOTOR

(71) Applicant: Michael Mark Anthony, Milton, FL (US)

(72) Inventor: Michael Mark Anthony, Milton, FL (US)

( * ) Notice: Subject to any disclaimer, the term of this patent is extended or adjusted under 35 U.S.C. 154(b) by 0 days.

(21) Appl. No.: 19/054,410

(22) Filed: Feb. 14, 2025

Related U.S. Application Data

(60) Provisional application No. 63/630,588, filed on Feb. 14, 2024.

(51) Int. Cl.
| | |
|---|---|
| *F02G 1/043* | (2006.01) |
| *F02C 1/02* | (2006.01) |
| *F02C 1/10* | (2006.01) |
| *F02C 7/36* | (2006.01) |
| *F04B 53/10* | (2006.01) |
| *H02N 11/00* | (2006.01) |

(52) U.S. Cl.
CPC .............. *F02G 1/0435* (2013.01); *F02C 1/02* (2013.01); *F02C 1/10* (2013.01); *F02C 7/36* (2013.01); *F04B 53/1082* (2013.01); *H02N 11/008* (2013.01); *F02G 2270/80* (2013.01); *F02G 2270/90* (2013.01)

(58) Field of Classification Search
CPC .......................... F02G 2270/80; H02N 11/008
See application file for complete search history.

(56) References Cited

U.S. PATENT DOCUMENTS

| | | | | |
|---|---|---|---|---|
| 2010/0308601 | A1* | 12/2010 | Walden .................. | H02K 53/00 |
| | | | | 310/152 |
| 2013/0099601 | A1* | 4/2013 | Maenosono ........... | H02K 53/00 |
| | | | | 74/DIG. 9 |
| 2017/0077782 | A1* | 3/2017 | Yamano ............... | H02K 7/1815 |
| 2021/0135602 | A1* | 5/2021 | Almofadda ............ | H02N 11/00 |

FOREIGN PATENT DOCUMENTS

| | | | | | |
|---|---|---|---|---|---|
| JP | H0223077 | A | * | 1/1990 | |
| KR | 20090076530 | A | * | 7/2009 | ............. H02K 53/00 |
| WO | WO-2005031953 | A2 | * | 4/2005 | ............. H02K 53/00 |
| WO | WO-2013018610 | A1 | * | 2/2013 | ............... F03G 7/10 |

* cited by examiner

*Primary Examiner* — Laert Dounis

(74) *Attorney, Agent, or Firm* — Frank L. Kubler

(57) ABSTRACT

An apparatus includes a circumferential array of rotatable magnetic field generating members centered on an axis of rotation and free to rotate about said axis of rotation; and wherein said rotatable magnetic field generating members are encircled by a circumferential array of radially reciprocating magnetic field generating members free to move reciprocally in a radial direction when pushed by a momentary force of fixed duration; and such that said radially reciprocating magnetic field generating members repel said repel said rotatable magnetic field generating members during the duration of said force and cause them to rotate about said axis of rotation; and such that upon rotation, and after the duration of said force, said rotatable magnetic field generating members repel said reciprocating magnetic field generating members in turn to repeat the process when said force is reapplied to said reciprocating magnetic field generating members for said duration.

15 Claims, 16 Drawing Sheets

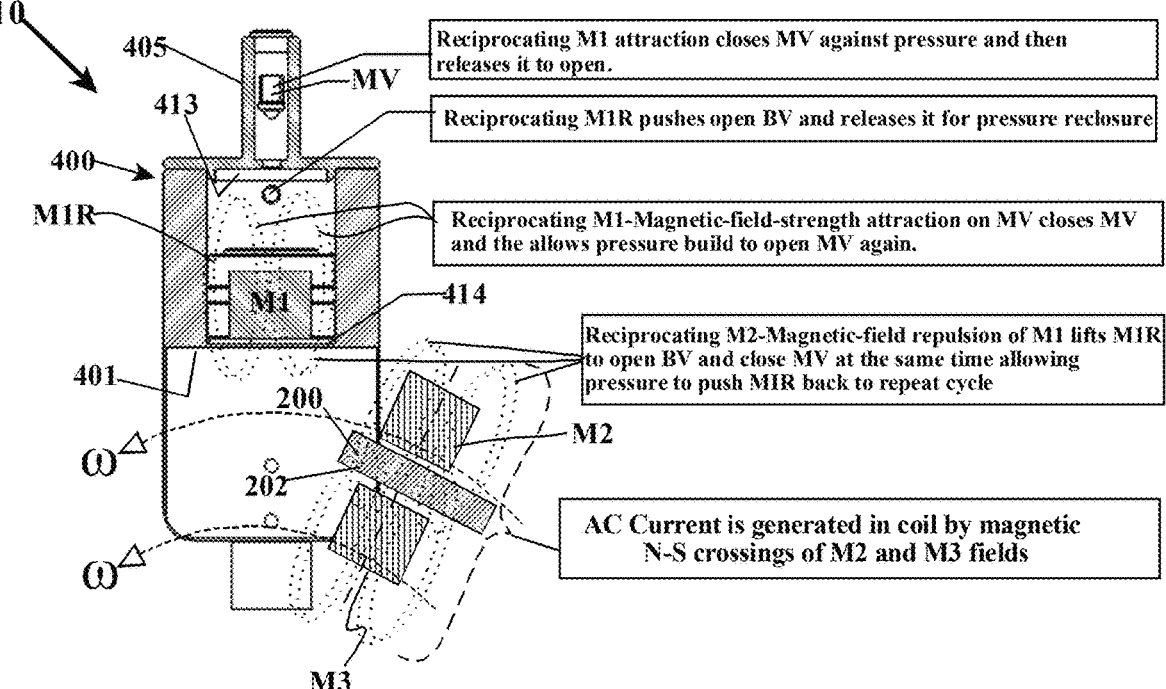

10

405

413

400

M1R

401

MV

M1

200

202

414

M2

M3

ω

ω

Reciprocating M1 attraction closes MV against pressure and then releases it to open.

Reciprocating M1R pushes open BV and releases it for pressure reclosure

Reciprocating M1-Magnetic-field-strength attraction on MV closes MV and the allows pressure build to open MV again.

Reciprocating M2-Magnetic-field repulsion of M1 lifts M1R to open BV and close MV at the same time allowing pressure to push M1R back to repeat cycle AC Current is generated in coil by magnetic N-S crossings of M2 and M3 fields All cycles simulatneously occur on array of 400

Fig.8

The reciprocating magnetic field of M1 attraction as it approaches TDC closes MV
against fluid pressure and then releases it to open as it receded to BDC.

20

10

10

10

THERMO-MAGNETIC MOTOR

FILING HISTORY

This application continues from provisional patent application No. 63/630,588 filed on Feb. 14, 2024.
   A—Thermo-Magnetic Engine—Non-Provisional Application

BACKGROUND OF THE INVENTION

1. Field of the Invention

The present invention generally relates to the field of thermal engines using non-combustible and combustible fuels for storing energy and reusing this energy when needed at a later time. More specifically, the present invention relates to a thermos-electromagnetic motor that utilizes reciprocating magnetic fields to convert stored potential energy in a thermal mass to regenerate mechanical energy using expansion pressure of fluid vapors and gases.

Thermal engines have been known for a long time. The main problem with existing thermal engines is finding a consist way of maximizing the expansion of a fluid to generate enough torque to do work without leaks, and energy losses.

The use of thermal batteries and fluids to drive motors using phase changes is the subject of U.S. Pat. Nos. 8,186, 160 and 9,500,158 B1 issued to the present inventor. In those inventions, fluid under phase change when passed through a thermal battery that is used to store thermal energy. The fluid undergoes a phase change and expands and drives a thermal motor. The thermal battery stores thermal energy for later use and as such, the technology has the advantage of not needing an external energy source to drive the thermal motor. Such a solid-state thermal battery can be used in conjunction with air and other fluids to drive thermal motors according to the present invention. Prior inventions mentioned above granted to the present inventor further describe the use of reciprocation piston motors as thermal motors using a phase change in expansion fluids as the driving fluids.

Advantageously, additional power from the wasted energy of such thermal motors can be incorporated to perform work. A combination of the thermal motor technology using the phase changes of a liquid in combination thereof with a magnetic configuration, allows the advantageous use of thermal energy without transmission losses due to mechanical contact between the power train components. The inventive aspect of the present invention is in the combination of a single means to achieve both a solid-state thermos-electromagnetic motor that can generate a lot of mechanical torque, generate electrical energy and operate using both thermal fluids and stored electrical energy, without the need for contact transmission through gears.

In a conventional gas motor, combustible fuel enters into the cylinder expansion chamber and is combusted and expands. The energy of the expansion allows the piston to move a crankshaft and cause motion. However, a reciprocating piston confined in a cylinder case is needed to achieve this goal and convert the pressure generated by combustion into mechanical motion. In the present invention, no crankshafts and no gearing is needed. The present invention teaches a novel method of achieving the conversion of thermal energy to electric and mechanical energy without the need for gearing.

The present invention differs from all prior art using air and gears to generate mechanical motion. In prior art conventional air motors, one of two methods is used to generate mechanical motion from pressurized air and gases. In one method, the conventional reciprocating piston in cylinder is used as used in a conventional gas motor. This method uses crankshafts and causes vibration and energy losses and does not fully use a continuous flow smooth flow of pressurized fluid vapor. In another method taught by prior art, a rotating vane and a fixed housing are used to drive vanes under pressure and generate mechanical motion. In some versions, the rotating vanes are made of gear teeth that are rotating close to a fixed housing surface to generate a pressure difference that drives the gear relative to the fixed housing. Gas under pressure is released from an intake port to one side of rotating vanes (which can be gear teeth also), to push the vanes and exit through an exit port after performing mechanical work. The gas is generally introduced on the high-pressure side of the housing to impact one side of the vanes to act as a driving force on the vanes and generate rotational motion. The gas then exists through an exhaust port.

Piston pumps are well known for converting stored pressure potential of gases and vapors to mechanical energy. The main problem with such piston engines is energy loses due to reciprocating transmissive loses from crank-shaft mechanisms linking the pistons to the drive shaft. Other energy losses result from leakage of fluids through seals and valves.

The use of complicated valves and timing mechanisms in most engines result in cost, design difficulties and loss of operational efficiency. Multi-piston configurations still need multiple transmission crank-shafts to perform the conversion of linear strokes to rotary motion. Such multi-pistons are generally arranged with a linear crankshaft with multiple crank rods, and as such, they require distribution of power transmissive mechanisms over a long crank shaft.

The present invention eliminates the need for crank shafts, and transmissive mechanisms made from mechanical components. In a sense the present invention is likened to a thermos-electromagnetic motor using thermally expansive energy and magnetic fields to generate both mechanical and electrical energy.

The present invention allows the transmission of power from a piston-like setting without a crank-shaft. As a result, the engine described by the present invention can be scaled by simply multiplying its configuration axially. The number of transmissive power-generating components of the apparatus is only limited by its diameter, and any size motor can be created. Further, there is very little or no transmissive energy loses due to the nature of the forces used by the present invention.

The present invention can be powered by means of a thermal battery TB which uses a thermal mass TM to store energy. However, the apparatus described by this invention can also uses any pressure source PS such as a compressor, and a steam generating device to power it. The apparatus can be directly powered by solar energy, since the difference in pressure of the exhaust fluid and the intake fluid is essentially what powers the apparatus. A pressurized fluid source is all that is needed to power the apparatus.

In all cases, the term "fluid", simply means a substance which can be modified by either heat or mechanical means to generate a pressure, and for all practical purposes, the apparatus described by this invention can use pressurized gas vapors, compressed fluids, and pressurized liquids to operate.

It is known that the magnetic field repulsion increases inversely with the distance between two like poles of two magnets. This magnetic repulsive force can almost become infinitely large as the gap between two like poles of opposing magnetic field polarities becomes infinitesimally small. As such any transmission of power from one magnet to another by repulsion can only be limited by the forces that push the magnets to come close together. Since the power of the pushing methods used is the controlling factor for transmission of forces between magnets, there is very little loss of transmission of power between magnetic fields that oppose and attract. This fact is used in electrical motors, and the closer the rotor magnetic field comes to the stator magnetic field, the better the power transmission a can motor have. However, there is large difference between mechanical transmission of power using magnets with electrical conversion of fields for the transmission of power. For example, motors use electrical energy to generate opposing and like magnetic fields to drive the rotor relative to the stator. The main losses of this energy occur during the conversion of the electric fields to magnetic fields. The losses come from heat-loss, flux energy losses, and back EMF generated by the electric field conversion to magnetic fields. While two permanent magnets can be brought to repel without loss of magnetic field strengths, very little or no heat is lost in the action of power transmission. Obviously, in such electromagnetic motors, any loss of heat cannot benefit the motor's performance since electromagnetic motors do not rely on heat energy for power generation. Advantageously, if a thermally responsive fluid is used to transmit power, as in the present invention, any losses of heat within the fluids and mechanisms used can be used to benefit the transmission of this lost power.

In its simplest form, the apparatus can be used as a thermos-magnetic motor without generating electricity.

The development of high temperature AlNICO magnets, (Aluminum, Nickel and Cobalt magnets), makes them attractive to use as high temperature magnets in thermal engines. ALNICO magnets can operate continuously at temperatures of 420° F. This ability of ALNICO magnets to withstand high temperatures without loss of magnetic field strength, makes them usable in thermal systems that rely on both phase changes of fluids, and pressure changes due to compression. Advantageously, the present invention can use gases such as air, and liquids, such as water.

2. Description of the Prior Art

In view of the limited, only loosely-related and apparently not patentably relevant prior art known to the applicant in this field, the following are objects of the present invention.

It is thus an object of the present invention to provide for a simple and effective thermal motor which comprises piston retainers and rotating magnets to generate power.

It is another object of the present invention to generate power using a thermal battery and to convert this energy to stored electric energy in an electric battery for later use.

It is yet another object of the present invention to provide an apparatus which can be operated with non-combustible fluids with a phase change to expand from a liquid phase to a vapor phase and generate power thereby achieve a high degree of efficiency during operation.

It is further object of the present invention to provide an apparatus which can be operated with non-combustible fluids with a phase change to expand from a liquid phase to a vapor phase and generate reciprocating actions on piston retainers to repel and propagate rotating magnets to generate power and achieve a high degree of efficiency during operation.

It is still a further objective of the present invention to use simultaneous magnetic propulsion of multiple magnets on rotating magnets.

It is yet further objective of the present invention to use a multiplicity of stacked radial arrays of magnetic to generate a multiplication of power.

It is an additional object of the present invention to generate multiple torque capability by using magnetic fields at various radial locations.

It is a still additional object of the present invention to provide and thermal battery which can be used in conjunction as a thermal mass to store heat energy for the apparatus.

It is also a yet additional object of the present invention to generate electric currents during rotation of its array of rotating magnets.

It is still another object of the present invention to provide a thermal motor with a thermal battery in which pressure is generated when a cooling fluid expands from a liquid state such as water to a gaseous phase such as steam, to power generate power.

It is yet another object of the present invention to disclose a thermal motor that can be operated in a multi-stroke fashion without a crank.

It is a further object of the present invention to disclose a thermal motor that can be recharged over a period of time by electric thermal heating means to store energy in a thermal battery, including a means using cartridge heater, a means using an induction coil, a means using lasers, a means using plasma heating, a means using exhaust heat from a conventional motor.

It is a still further object of the present invention to disclose an apparatus that can generate a variety of motions, including oscillatory motion, circular rotary motions and pulsating motions of different frequencies.

It is a yet further object of the present invention to provide such an apparatus that is free of mechanical gearing, reducing energy losses associated with mechanical transmission.

It is finally an object of the present invention to provide a thermal motor which is highly efficient and easy to operate and environmentally friendly.

SUMMARY OF THE INVENTION

The present invention accomplishes the above-stated objectives, as well as others, as may be determined by a fair reading and interpretation of the entire specification.

A stationary frame member made from non-magnetic material is used for the apparatus, and it holds an evenly spaced and symmetric circumferential array of non-magnetic stationary cylinder block members centered at a fixed center. The stationary cylinder block members each have radially dispositioned cylinder chambers whose axes of symmetry is also radially aligned to the fixed center of the frame member. The cylinder chambers hold piston retainers that can move sealingly and slidingly in radially inward and radially outward strokes within the cylinder chambers.

In its simplest form, the apparatus of the present invention uses an evenly spaced circumferential and planar array of radial rotating magnets. The rotating magnets are attached to a drive disc member to form a symmetric circumferential array; the drive disc member is non-magnetic and the rotating magnets are held on disc-member surfaces such that they can rotate about the center of axis of bearings held by a stational shaft member centered on the frame member's fixed center. The upper radial span of the rotating magnets is spaced a radial gap of δ from the inner radial surfaces of the stationary cylinder block members. Advantageously, the rotating magnets can freely rotate at radii smaller by a radial gap of δ from the stationary cylinder block members. The gap 8 should be as small as possible. This provides clearance for the rotating magnets to freely rotate within the circumferential array of stationary cylinder block members.

The stationary cylinder block members and the cylinder chambers within them, are made from non-magnetic materials. The cylinder chambers are cylindrical cavities within the stationary cylinder block members. The axis of symmetry of the cylinder chambers are radially aligned in a symmetric circumferential array to line up with the center of rotation about the fixed axis of the shaft member. The cylinder chambers have an upper cylinder chamber wall and a lower cylinder chamber wall and a cylindrical chamber between them. Each cylinder chamber has a cylindrical piston retainer within it. Each piston retainer occupies a fixed portion of the volume of the cylinder chamber, leaving room for reciprocating displacements of the piston retainers within them. The piston retainer is defined to be at Top Dead Center (TDC) when the radially outward piston retainer surface is closest to the radially outward cylinder chamber surface of the cylinder chamber. The piston retainer is at Bottom Dead Center when radially inward piston retainer surface is closest to the radially inward cylinder chamber surface of the cylinder chamber. Each piston retainer has a circumferential non-magnetic seal ring that forms a sliding seal between the piston retainer cylindrical wall and the cylinder chamber cylindrical wall. A magnet oriented with its field symmetric out the radial direction is held by each piston retainer. Thus the magnet can reciprocate a magnetic field in a radially outward stroke and in a radially inward stroke.

The stationary shaft member is fixed to the frame member and does not rotate, but acts as a center of rotation for the apparatus.

The rotating magnets held by the drive disc member have their magnetic fields symmetric about the radial directions of their respective locations. In the foregoing, the polarity N indicates a North pole of a magnetic field, and the polarity S indicates the South pole of a magnetic field.

The polarity of the upper rotating magnet's surface and the polarity of the lower rotating magnet's surface, and of the piston retainers may be reversed as needed. By choice, and for explanation purposes only, the rotating magnets have a radially outward rotating magnet surface of polarity N, and a radially inward rotating magnet surface of polarity S. The reciprocating magnetic fields held by the magnets within the piston retainers are oriented such that the radially outward magnet surface is the N pole, and the radially inward magnet surface is the S pole.

Each of the circumferential array of radially spaced rotating magnets are attached to a drive disc-member surfaces and the drive disc-member rotates on bearings held by a stationary shaft member. The rotating magnets, and their magnetic fields form symmetric circumferential array that can rotate freely around the fixed center of the frame member. During their rotation about the stationary shaft members' axis, all the rotating magnets' magnetic fields can axially align with all the radial axis of the circumferential array of the piston retainer magnet's magnetic field. Advantageously, multiple diametrically parallel circumferential arrays of rotating magnets can be placed coaxially to co-rotate with the same drive disc-member about the same shaft member in order to increase the power of the apparatus.

The apparatus can then have a symmetric array of circumferentially radially reciprocating magnetic fields that surround rotating magnetic fields.

Advantageously, the diametric disposition of all the reciprocating magnetic fields is closely aligned and determined by the synchronicity of the reciprocating action of the piston retainers. However, each reciprocating magnetic field depends on the response of its piston retainers to fluid pressure, and therefore each reciprocating magnetic field can be altered as required by adjusting its pressure feed of pressurized fluid. This ability is only possible with the magnetic power transmission illustrated by the present invention, and cannot be achieved by a crankshaft transmission.

Ideally, the power transmission can be maximized by synchronizing all the reciprocating actions of the piston retainers. One can imagine these fields are a radial pulsation of circumferential fields around the rotating magnets. The general principle of operation is to time the synchronicity of the radially inward circumferential stroke of the piston retainers' magnetic fields to just slightly angularly misalign in one angular direction of rotation, with the rotating magnetic fields, such that a repulsion rotates the drive disc member in that direction. Since each rotating magnetic field closest to a piston retainer's magnetic field is opposite to the piston retainer's magnetic field, they will repel each other during their misaligned radial and circumferential encounters.

Advantageously, as shown in FIG. 15, the intake valve and the exhaust valve can also be electronically controlled to allow a variety of reciprocating magnetic fields to drive the drive disc member. For example, a repulsive pulse wave can be generated circumferentially to successively drive the drive disc member.

For example, the left side of the rotating magnets can be subjected to a clockwise rotation, while the right side of the rotating magnets can be subjected to a braking force, such that the rotation speed of the drive disc member can be controlled by electronic means.

Advantageously, the apparatus can be configured to oscillate at varying oscillation rotatory motions and forces.

The cylinder chambers are formed within cylinder block members. The apparatus comprises a circumferential array of rotating magnet members of at least one or more of co-rotating magnets radially aligned and radially spaced to rotate about a common shaft member axis, on a common frame member fixed axis. The fixed non-rotating non-magnetic cylinder blocks form a circumferential array of cylinder chambers each holding a piston retainer that can reciprocate within its non-magnetic cylinder chamber. By fixed is meant the rotations transmitted by the drive disc-member do not rotate the circumferential array of cylinder chambers relative to frame member that holds the apparatus to devices powered by the apparatus, such as vehicles.

Each piston retainer occupies a fixed portion of the volume of the cylinder chamber, leaving room for reciprocating displacements of the same within the cylinder chamber. The piston retainer is cylindrical, and its upper piston retainer surface is closest to the upper cylinder chamber surface, and its lower piston retainer surface is closer to lower cylinder chamber surface of the cylinder chamber. The piston retainer is at Top Dead Center (TDC) when its upper piston retainer surface is closest to the upper cylinder chamber surface of the cylinder chamber. The piston retainer is at Bottom Dead Center when its lower piston retainer surface is closest to the lower cylinder chamber surface of the cylinder chamber. The piston retainer has a circumferential seal ring that forms a sliding seal between the lower piston retainer surface and the upper piston retainer surface and with the cylindrical chamber wall.

The cylinder chambers are designed for fluid pressure transmission within the cylinder chamber to move the piston retainers within the cylinder chamber. Each cylinder chamber has an intake port close to the TDC of the cylinder chamber that passes through the cylinder chamber cylindrical wall to allow pressurized fluid from a fluid pressure tank to be transmitted to the cylinder chamber when so desired, through a ball valve that can be closed and opened to respectively, to cut off and supply pressurized fluid into the cylinder chamber, respectively. The cylinder chamber has an intake port close to the TDC position, that is closed off by the ball valve held within the cylinder block. The intake port extends to a larger cylinder block port hole within the cylinder block that connects sealingly to an intake tube. The intake tube connects to a fluid pressure tank which stores a pressurized fluids such as, for example, steam and air.

The ball valve has a spherical surface that partially protrudes into the cylinder chamber and partially remains within the cylinder block port hole. The cylinder block intake port hole terminates on a smooth ball valve seat for the ball valve, such that the spherical surface of the ball valve that does not project into the cylinder chamber will sealing seat on the ball valve seat to seal off the intake port when desired.

A magnetic exhaust valve allows, when permitted, the transmission of exhaust fluids from the cylinder chamber through a cylinder block exhaust hole, to a radiator R by means of an exhaust return tube. The ball valve is mechanically opened by displacing it from its sealing seat position when the piston retainer come in close proximity to the Top Dead Center (TDC) position of the cylinder chamber. TDC is radially outward from the Bottom Dead center (BDC) of the cylinder chamber. On the other hand, the magnetic exhaust valve is opened by pressure overcoming the magnetic field attraction when the piston retainer is at BDC, and the magnetic hold on it is minimum.

The volume of the cylinder chamber between the its radially outward surface 413 and the radially inward surface 414 is referred to as the cylinder chamber C. The piston retainer M1R also has a lower piston retainer surface. The magnetic exhaust valve is made from highly magnetic material. Advantageously, when the piston retainers come to TDC, the magnetic field attraction of the magnetic exhaust valve is maximum, hence the attraction closes the magnetic exhaust valve to seal off the exhaust port from the cylinder chamber. Advantageously, the piston retainers come to TDC when the fluid in the pressure chamber has the minimum volume and minimum pressure, and maximum magnetic attraction for the magnetic exhaust valve.

Advantageously the piston retainer has a small clearance from the cylinder chamber axial wall. The central axis of the cylinder chamber is radially aligned with the magnetic axis of symmetry of the piston retainers. The piston retainers have a magnetic North Pole (N) and a Magnetic South pole(S) with magnetic field lines symmetric about the axis of symmetry of each piston retainer. Preferably, the piston retainers are cylindrical.

The ball valve closes off the intake port to the cylinder chamber by sealing off a ball valve seat when the piston retainer is located below its location and a portion of the ball valve projects into the cylinder chamber. When the piston retainer is at TDC, it preemptively closes the magnetic exhaust valve but opens the ball valve. Hence pressurized fluid can enter into the pressure chamber and force the piston retainer to go to BDC.

It is now necessary to make sure that the magnetic field polarity of the piston retainer upper surface always has the same polarity to the magnetic polarity of the upper surface of the rotating magnets.

Advantageously, during this pressure forced transfer of energy and radially displacement of the piston retainers, the piston retainers' N-magnetic field polarity comes closer to the N-polarity of all rotating magnets in proximity to their respective radial angular location, and causes all rotatable rotating magnets to be propelled and rotated away by the magnetic repulsions simultaneously. If there are x-rotating magnets, the total repulsion will be due to x-magnets simultaneously! This causes the drive disc-member to rotate about the shaft, and the torque from all the magnetic field repulsions can be transmitted simultaneously to drive devices such as by a pulley or by mechanical drive connections.

Advantageously, the next cycle of pressurization in the cylinder chamber occurs when the piston retainer is momentarily resting at BDC and when an arriving rotating magnet repels its forcefully to the TDC position. These repulsive propulsions occur all around the drive disc-member and they cumulatively provide large torque.

For example, if the magnetic fields can generate a repulsive force of 35 lbs at δ separation, and the radius of the upper surfaced of the rotating magnet is at radius 1 foot, then such a motor of the type herein described can generate at least 280-foot pounds of torque! The pressure required for a Unit square inch area of piston retainer surface will only be 35 psi. This is a very low pressure that can be generated by simply heating humid atmospheric air to about 400° F.

In short, an apparatus is provided including a thermo-electromagnetic motor with a symmetric circumferential array of radially aligned and radially spaced rotating magnets affixed to a drive disc-member centered on bearings held by a fixed shaft member to rotate freely. The apparatus further comprising a symmetric circumferential array of fixed non-rotating fixed cylinder chambers peripheral to said rotation; said cylinder chambers each having a piston retainer holding a magnet; said piston retainers sealingly slidable within said cylinder chambers in radial directions of the apparatus; and said magnets within said piston retainers, acting as pressure-controlled radially reciprocating magnetic fields in said radial directions of the apparatus; such that, said the piston retainers momentarily keep open intake ball valves within said cylinder chambers and allowing a pressurized fluid source to fluidly connect pressurized fluid F, to flow into said cylinder chambers to induce radially inward strokes of said piston retainers; and said magnets in said piston retainers act to magnetically attract and close magnetic exhaust valves also fluidly connected to said cylinder chambers to keep said reciprocating piston retainers pressurized for a portion of said radially inward stroke and causing magnetic repulsions between said reciprocating magnetic fields and said rotating magnets; and causing said rotating magnets to rotate said disc-member about the axis of said fixed shaft member; and at a predetermined portion of said radially inward stroke, said reciprocating piston retainers close said intake ball valves; and at another predetermined portion of said radial inward stroke they release their magnetic holds on said magnetic exhaust valves allowing them to open and exhaust the internal pressure of said pressurized fluid during said radially inward stroke to completion; and as said disc-member rotates, a next set of rotating magnetic members rotate to align their fields repulsively with said reciprocating magnetic field, and said rotating magnetic members repel said piston retainers for a radially outward stroke within said cylinder chambers; and at a predetermined portion of said radially outward stroke, said piston retainers open said intake valves and also magnetically attract and close said magnetic exhaust valves to repeat the cycle.

BRIEF DESCRIPTION OF THE DRAWINGS

Various other objects, advantages, and features of the invention will become apparent to those skilled in the art from the following discussion taken in conjunction with the following drawings, in which:

FIG. 8 shows the reciprocating magnetic fields' action on the magnetic exhaust valve and the piston retainer in the beginning of the outward radial stoke of the piston retainer.

DETAILED DESCRIPTION OF THE PREFERRED EMBODIMENTS

Figure 1:
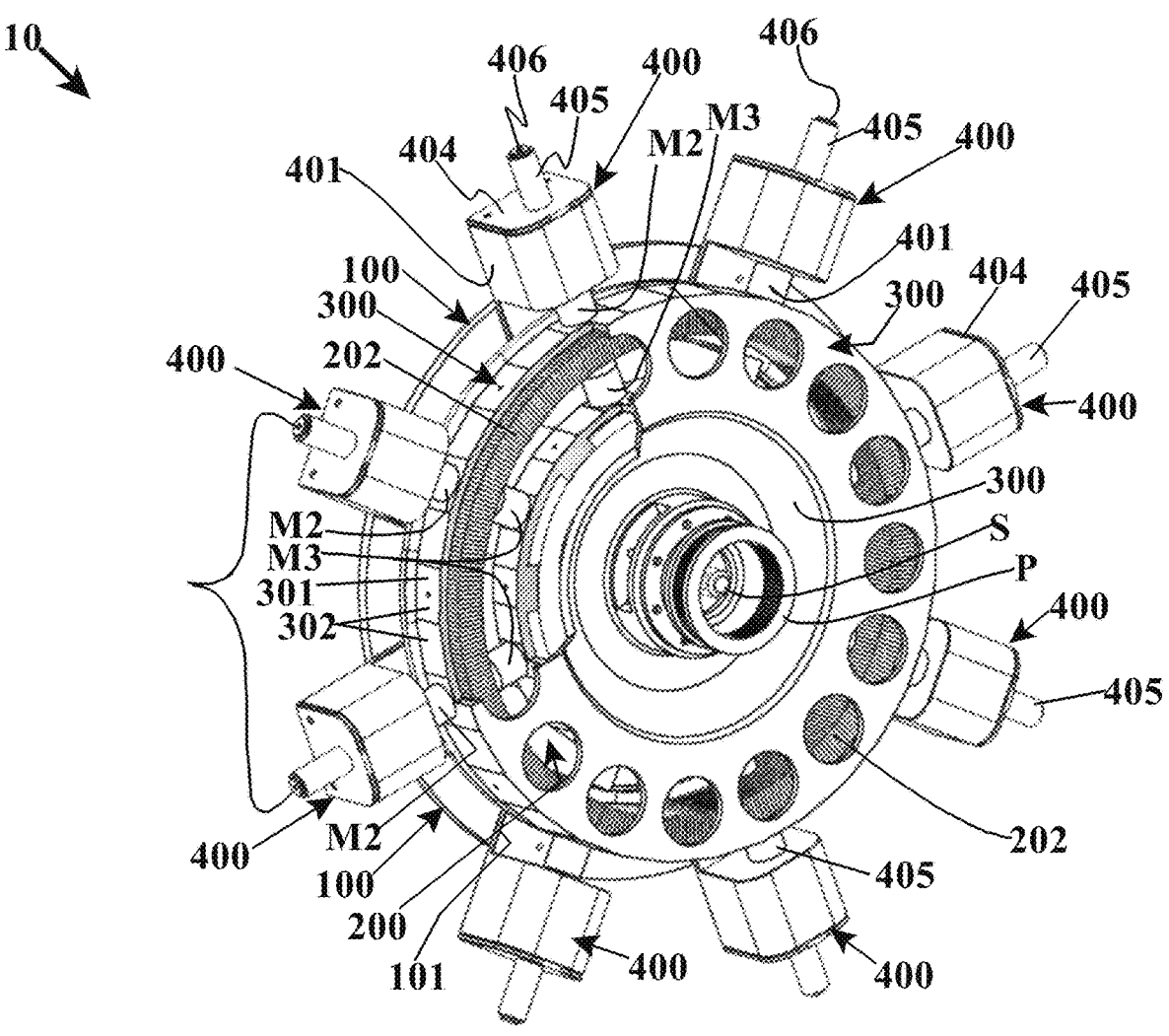
FIG. 1 shows the apparatus assembled with a cut away of a portion of the disc member to show the coil and the magnet arrangements. The exhaust cylinder head covers are shown ready for exhaust tube connections.
Figure 2:
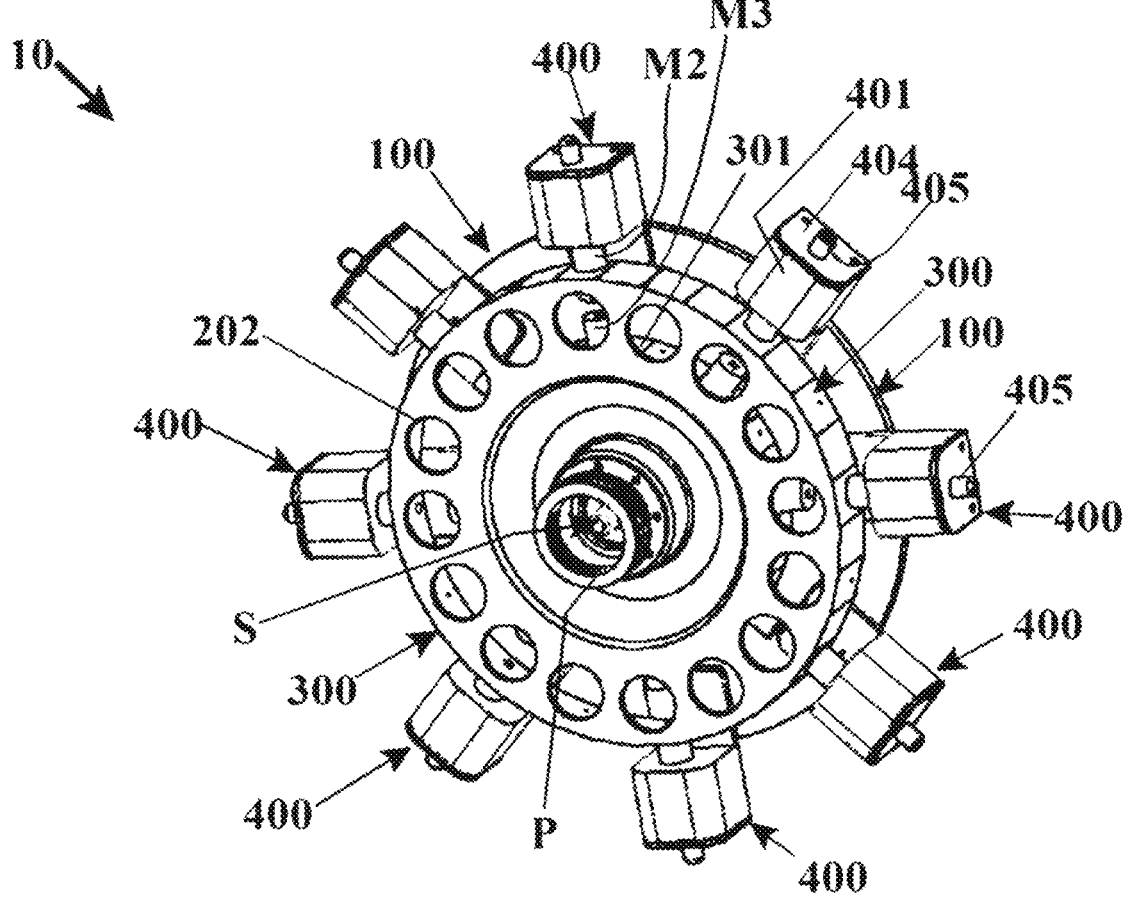
FIG. 2 shows the apparatus with the symmetrical arrangement of magnets.
Figure 3:
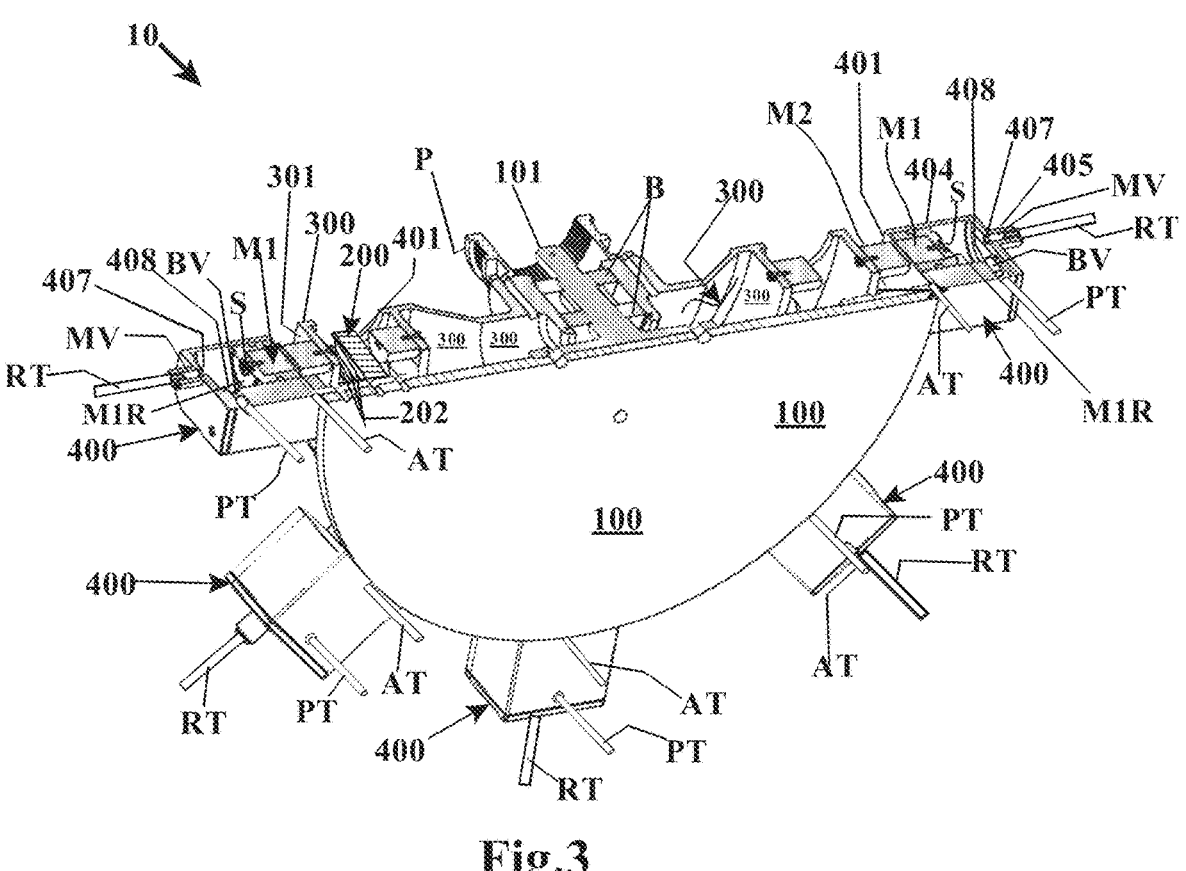
FIG. 3 shows a sectional view of the apparatus with a detailed cross-section showing the stationary shaft, the disc member on bearings, a pulley connected to the disc member, cylinder chamber, the intake ball valve, the magnetic exhaust valve, the piston retainer, and the magnet arrangement of both the stationary and rotating magnets. The coil is shown for generating electric currents during rotations.
Figure 4:
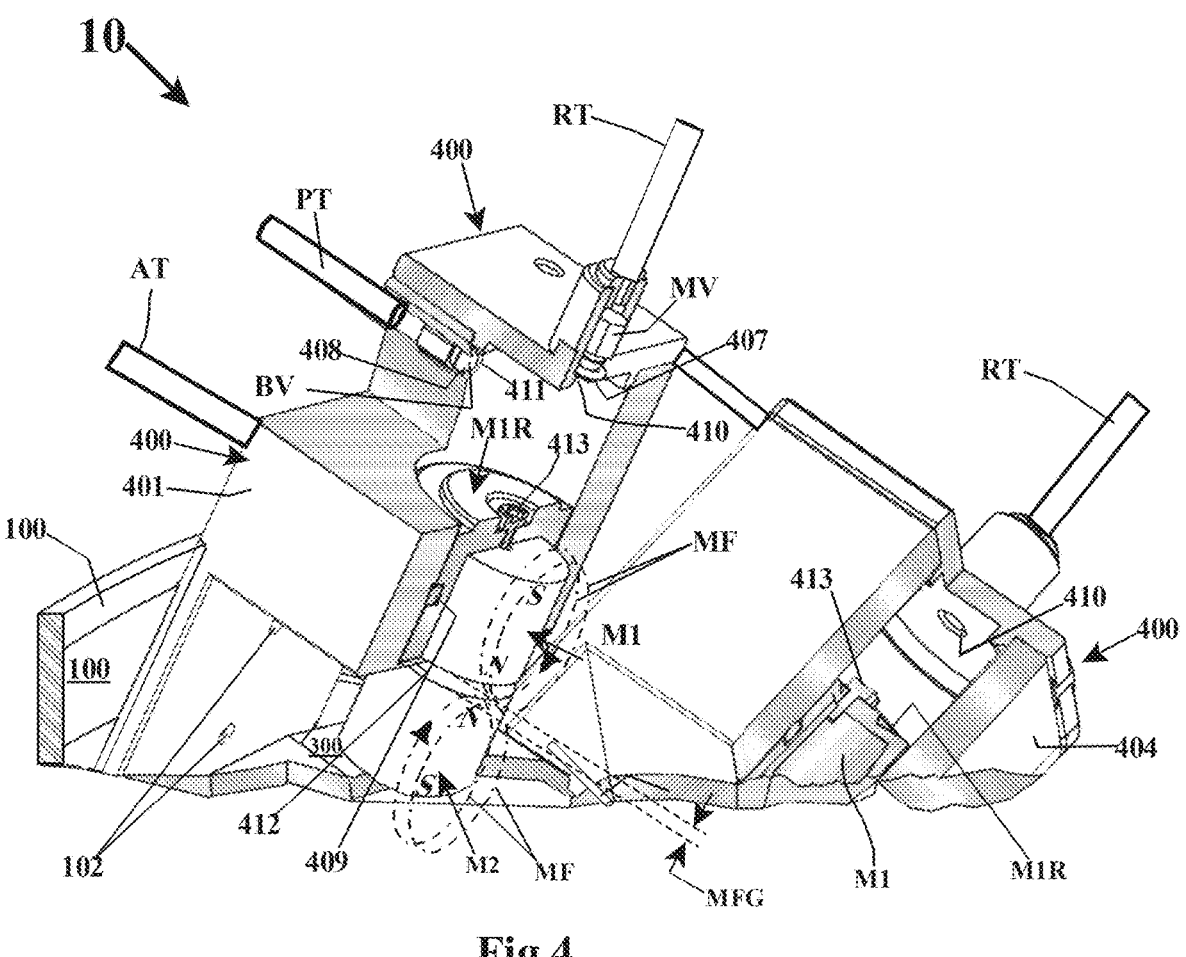
FIG. 4 shows a cut away perspective view of the cylinder chamber, the cylinder pressure chamber, the intake ball vale seated, the magnetic exhaust valve unseated, and the piston retainer at BDC and about to be repelled by the rotating magnet to go to TDC.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Referring to FIGS. 1-16, an apparatus 10 is disclosed, having a stationary frame member 100 is provided. Stationary frame member 100 is made from non-magnetic material is used as a fixed frame for the apparatus 10. Stationary cylinder block members 400 are provided. Stationary frame members 100 holds an evenly spaced, symmetric circumferential array of non-magnetic stationary cylinder block members 400 to span a radial distance h, for a fixed rotation axis of the fixed frame member 100. The stationary cylinder block members 400 each have radially dispositioned cylinder chambers C, whose cylindrical axes of symmetry is also radially aligned through the fixed center C of the frame member 100. The cylinder chambers C hold a symmetric circumferential array of fixed non-rotating magnetic M1, held within piston retainers MIR. The magnets M1 are retained within the piston retainers MIR by one of pressfitting them, and by chemical and mechanical bonding them together. The piston retainers MIR are designed to slide freely for an inward radial stroke S1 and an outward radial stroke S2, respectively. within the cylinder chambers C in radial directions. The piston retainers MIR, and the magnetics M1 form magnets M1 and the piston retainers MIR act to provide for a pressure-controlled reciprocating magnetic field RMF in radial directions.

The apparatus 10 is a thermo-magnetic motor comprising a symmetric circumferential array of radially aligned and radially spaced rotating magnets M2, and optionally, a second set of rotating magnets M3 held by a drive disc member 300 that freely rotates on bearings B held by a fixed shaft member S.

The rotating magnets M2, and optionally, the second set of rotating magnets M3, are affixed by screws and optionally welded by mechanic and chemical means to the rotating disc-member surfaces 301 a rotating disc-member 300 that is centered to freely rotate on bearings B held by a fixed shaft member 101 affixed and centered on the fixed rotation center O, of the fixed frame member 100. The disc-member surfaces 301 are tangentially symmetric and radially centered to rotate with the disc-member 300 in a dynamically and statically balanced rotation about the fixed frame member 100, and therefore, on the fixed shaft member S. The piston retainers M1R can move sealingly and slidingly in radially inward strokes $S_1$ and radially outward stroke $S_O$, within the cylinder chambers C. The axis of symmetry of the cylinder chambers C is radially aligned in a symmetric circumferential array. Each cylinder chamber C has a radially outward cylinder chamber surface 413 and a radially inward cylinder chamber surface 414, separated by a chamber wall 404 to form the cylinder chamber C between them. Each cylinder chamber C has within it, a cylindrical piston retainer M1R. Each piston retainer M1R is non-magnetic and it occupies a fixed portion of the volume of the cylinder chamber C, leaving room for reciprocating displacements of the piston retainer M1R.

Each piston retainer M1R has a circumferential grove 412a holding an elastomeric non-magnetic O-ring-seal 412, between its radially outward surface M1Ra and its radially inward surface M1Rb. The O-ring 412 forms a sliding seal with the cylinder chamber wall 404. The O-ring-seal 412 separates the cylinder chamber C into two fluidly separated chambers: a cylinder atmospheric chamber A between the O-ring seal 412 and a cylinder pressure chamber PC. The cylinder chamber C, is divided by the O-ring seal 412 into the cylinder pressure chamber PC and the cylinder atmospheric chamber AC. The cylinder pressure chamber PC consisting the contiguous portion of the volume of the cylinder chamber C between the O-ring seal 412 and the radially outward cylinder chamber surface 413. The cylinder atmospheric chamber AC consists of the contiguous volume of the between the O-ring seal 412 and radially inward cylinder chamber surface 414.

A cylinder-head cover 405 is provided to seal off the cylinder chamber C and form a contiguous volume of for the cylinder pressure chamber PC. The cylinder-head cover 405 has a tubular connection 405a that holds magnetic exhaust valve MV to slide within it. The magnetic exhaust valve MV can slide and form a seal with a cylinder-head cover exhaust port 407 that allows exhaust fluid EF to exit into a return tube RT from the cylinder pressure chamber PC when the magnetic exhaust valve MV move radially outward when pushed to open by pressurized fluid PF in the cylinder pressure chamber PC. The return tube RT is connected sealingly and fluidly to a radiator R.

Figure 10:
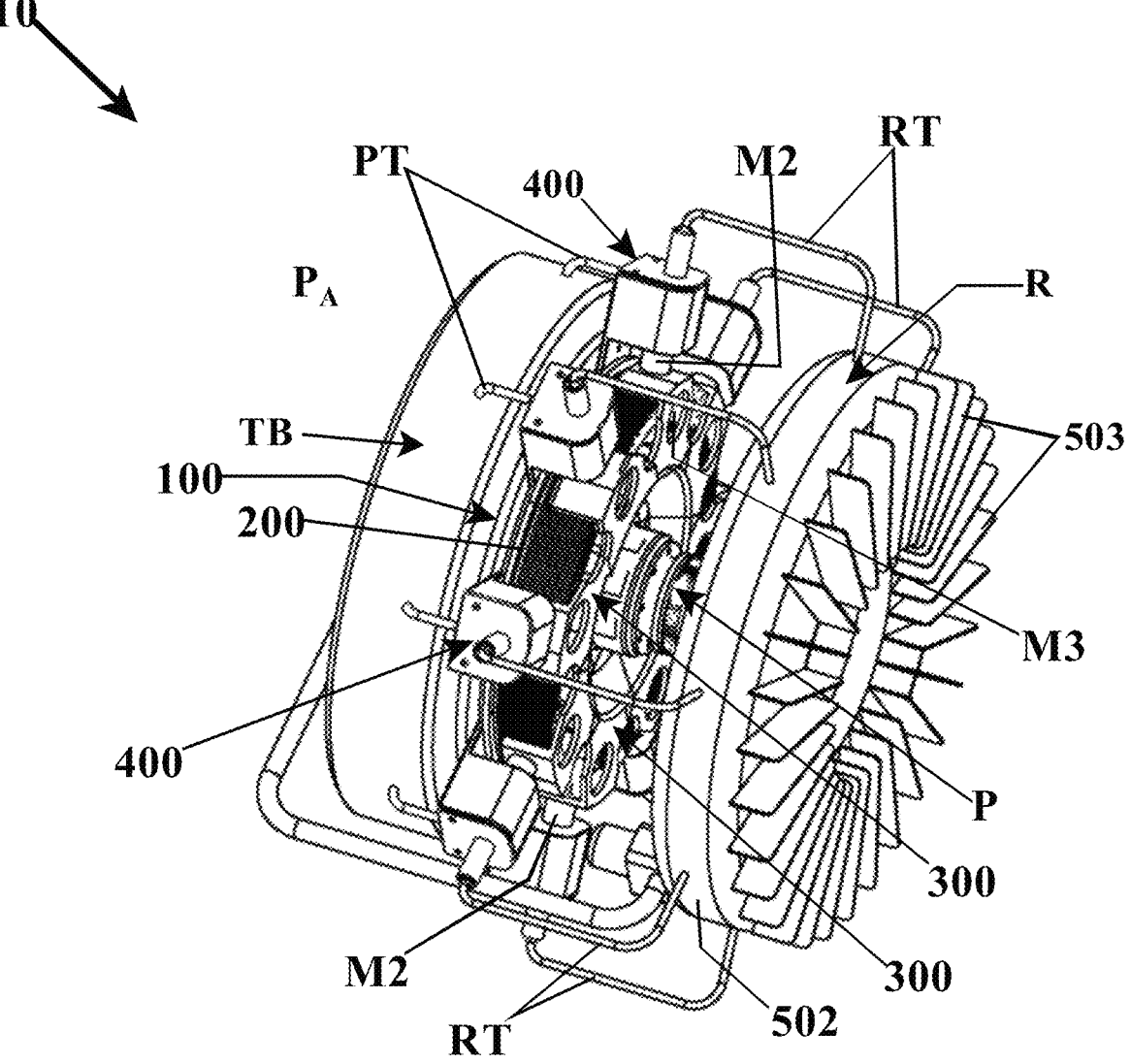
FIG. 10 the apparatus connected to a radiator by the return tubes from the exhaust port, and also shows the connection of the apparatus to the intake ports through Pressure tubes from a thermal battery TB. Details of the coil, the pulley and the disc member are also shown.

As shown in FIG. 10, Radiator R is a contiguous hollow cavity 502 that accepts all the exhaust fluid EF within it from the apparatus 10. Radiator R causes heat exchange between the exhaust fluid EF with the atmosphere by means of radiator fins 503.

Figure 5:
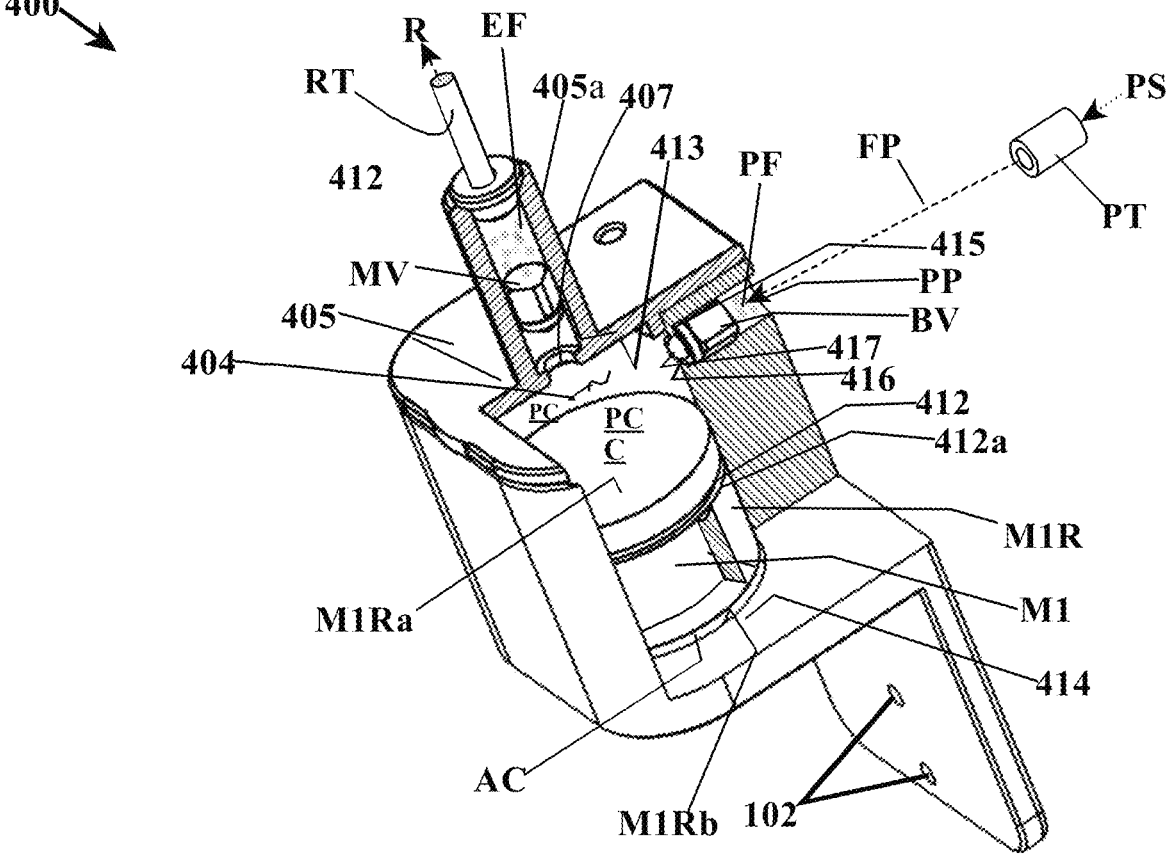
FIG. 5 shows the piston retainer at BDC with details of the valves, the piston retainer and the exhaust and intake ports. The tube connections to the Radiator and to the pressure source are shown in part.
Figure 6:
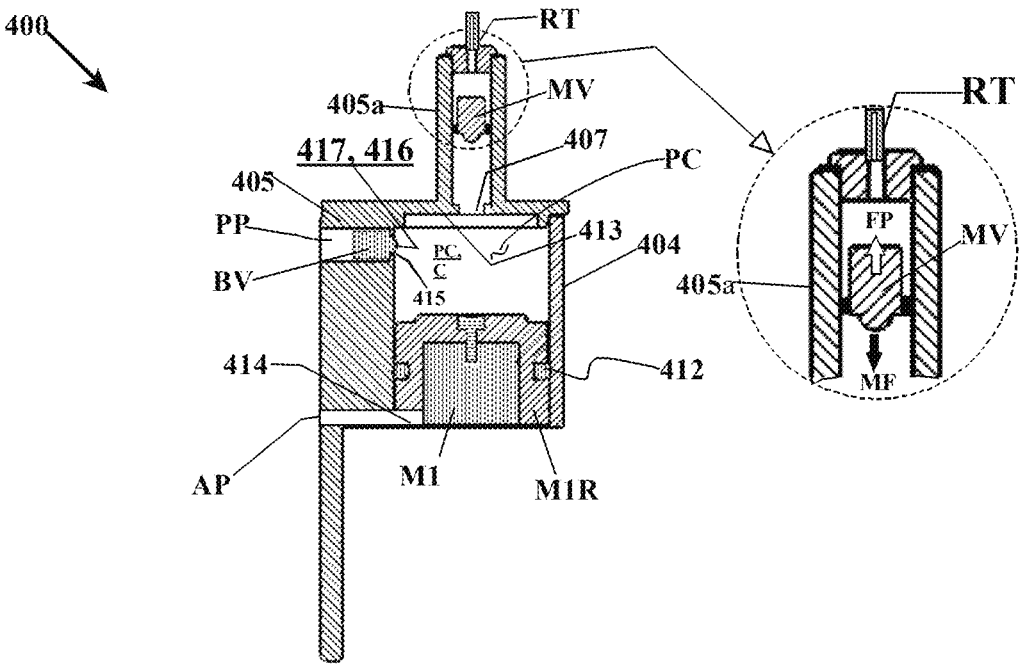
FIG. 6 shows the piston retainer at BDC with details of the forces acting on the magnetic exhaust valve, the piston retainer and the exhaust and intake ports. The tube connections to the Radiator and to the pressure source are shown in part.
Figure 7:
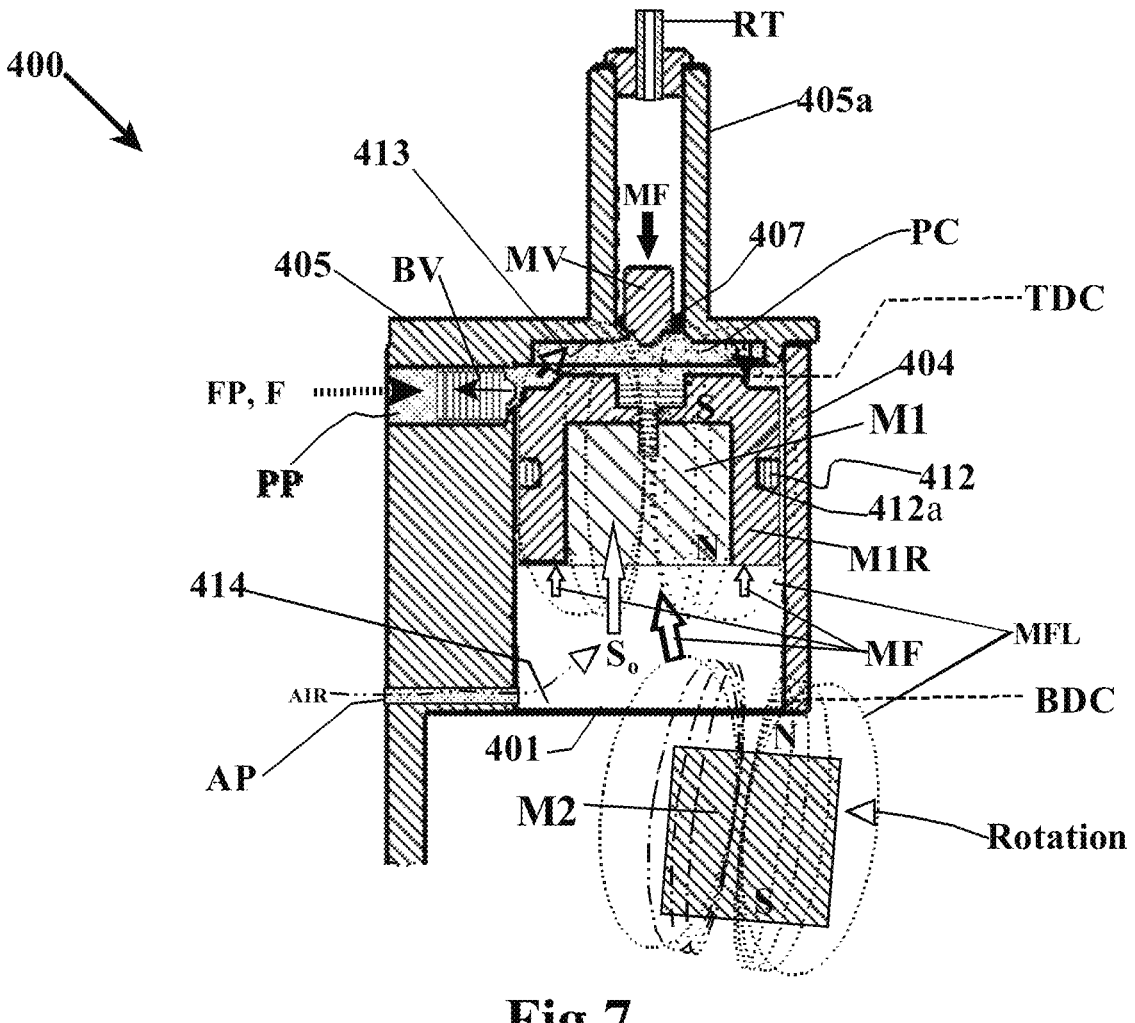
FIG. 7 shows the magnetic field forces interacting between the rotating magnets and the stationary magnets in the piston retainer. The rotating magnet is shown pushing the piston retainer to TDC to open the intake valve by unseating the ball valve and at the same time closing the exhaust valve to allow fluid pressure to build up for a radially inward stroke to BDC.
Figure 9:
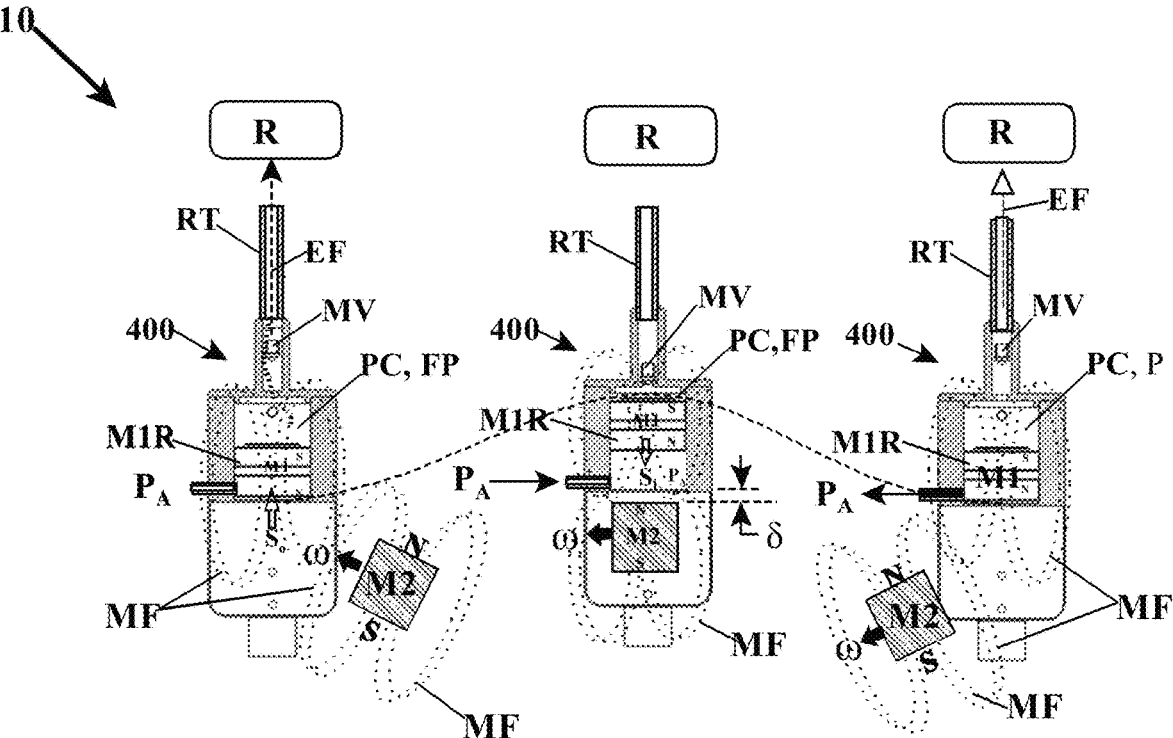
FIG. 9 shows the sequence of outward stroke and inward stroke, the flow of atmospheric air into the cylinder atmospheric chamber and the flow of exhaust fluid to the radiator during the radial outward stroke $S_o$. The magnetic exhaust valve is shown open as the piston retainer pushes remnant exhaust fluid to the radiator in radial outward stroke $S_o$.

As shown in FIGS. 5 and 6, the magnetic exhaust valve MV is designed to be magnetically attracted by the magnet M1 when it is close to TDC, as it is carried by the piston retainer M1R to TDC. Thus, at TDC, the magnetic exhaust valve MV is attracted by the strong pull of the magnet M1 to close the exhaust port 407 by moving radially inward toward the magnet M1. When the piston retainer M1R and the magnet M1 are pushed radially inward away from the exhaust port 407 by fluid pressure FP, the magnetic attraction between the magnetic exhaust valve MV and the weakened magnetic attraction of the receding magnet M1 on the magnetic exhaust valve MV causes fluid pressure FP to overcome the Magnetic force MF and causes the fluid pressure FP to be push to open the magnetic exhaust valve MV from the exhaust port 407 opening the cylinder pressure chamber PC.

As shown in FIGS. 5 and 6, an intake pressure port PP in the cylinder block 400 is located at the TDC close to the radially outward cylinder chamber surface 413. The intake pressure ports PP can connect to a pressure tubes PT and transmit fluid pressure FP through pressure tube PT (shown partially cut off) and close to the cylinder chamber C. The intake pressure port PP has a ball sealing surface 415 that can be sealed by a ball valve BV when under fluid pressure TFP. The ball valve has a ball end 416 that can partially seat on the ball sealing surface 415 and form a ball valve projection 417 into the cylinder pressure chamber PC.

The piston retainer M1R is defined to be at Top Dead Center (TDC) when it is closest to the radially outward cylinder chamber surface 413 of the cylinder chamber C. The piston retainer MIR is at Bottom Dead Center (BDC) when it is closest to the radially inward cylinder chamber surface 414.

When the piston retainer M1R is close to Top Dead Center (TDC), it can displace the ball valve BV by pushing the ball valve projection 417 away from the cylinder pressure chamber PC and displace the ball end 416 from the ball sealing surface 415 to open the intake pressure port PP to fluidly allow pressurized fluid PF under fluid pressure FP to enter into the cylinder pressure chamber PC and push the piston retainer M1R away from TDC to BDC.

In its simplest form, the apparatus 10 of the present invention uses an evenly spaced circumferential and planar array of radial rotating magnets M2. The rotating magnets M2 are attached to disc-member 300 surfaces 301, to form a statically and dynamically balanced symmetric circumferential array, such that, they can rotate about the fixed frame member 100, and therefore, on the bearings B on the fixed shaft member S. The upper radial span of the rotating magnets M2 is spaced a small radial gap of δ from the radially inward cylinder block member surface 401. Advantageously, the rotating magnets M2 and the rotating magnets M3 can together freely rotate at radii smaller than the cylinder blocks 400 by a radial gap of δ from the radially inward cylinder block member surfaces 401. The gap 8 should be as small as possible for magnetic fields MFL between the rotating magnets M2 and the magnets M1 to interact in a repulsive manner. This provides clearance for the rotating magnets M2 to freely rotate without interference from the radially inward cylinder block member surface 401. Advantageously, the closer the magnetic M1 is to the magnet M2, the better the transmission of magnetic power as the piston retainer M1R reciprocates in the cylinder chamber C.

The stationary cylinder block members 400 and the cylinder chambers C within them, are made from non-magnetic material. The cylinder chambers C, are cylindrical cavities within the stationary cylinder block members 400 formed between the radially outward cylinder chamber surface 413 and the piston retainer M1R.

The apparatus 10 comprises a circumferential array of rotating magnets M2 and, if required, another set of magnets M3, can be placed at smaller radii to form an electric generating and a magnetic power drive device. The magnets M2 and the co-rotating magnets M3 are radially aligned and radially spaced to rotate about a common fixed shaft member 101's axis, on a common frame member 100's fixed axis.

The fixed non-rotating non-magnetic cylinder blocks 400 form a circumferential array of cylinder pressure chambers PC, each holding a piston retainer M1R with a magnet M1. The piston retainers MIR and the magnets M1 can reciprocate within the non-magnetic cylinder chambers C. By fixed is meant the rotations transmitted by the drive disc-member 300 do not rotate the circumferential array of cylinder chambers C relative to frame member 100 that holds the apparatus 10 to devices powered by the apparatus 10, such as vehicles.

Each piston retainer M1R occupies a fixed portion of the volume of the cylinder pressure chamber PC, leaving room for reciprocating displacements of the same within the cylinder pressure chamber PC.

The piston retainer M1R is cylindrical, and the radially outward piston retainer surface 413*a* is closest to the radially outward cylinder chamber surface 413. The radially inward piston retainer surface 414*a* is closest to the radially inward cylinder chamber surface. The piston retainer MIR is at Top Dead Center (TDC) when radially outward piston retainer surface 413*a* is closest to the radially outward cylinder chamber surface 413. The piston retainer M1R is at Bottom Dead Center (BDC) when radially inward piston retainer surface 414*a* is closest to the radially inward cylinder chamber surface 414. The piston retainer M1R has a circumferential O-ring seal 412 that forms a sliding seal between the with the cylindrical chamber wall 404 forming the cylinder pressure chamber PC and the cylinder atmospheric chamber AC respectively as it reciprocates. Hence the cylinder pressure chamber PC and the cylinder atmospheric chamber AC exchange volumes within the cylinder chamber C. The cylinder pressure chamber has a minimum volume at TDC, and the cylinder atmospheric chamber AC has minimum volume at BDC.

The cylinder pressure chambers PC are designed such that when fluid pressure FP is allowed to fluidly flow into the cylinder pressure chamber PC at TDC by the intake ball valve BV, the fluid pressure TFP will push the piston retainer M1R away from TDC to BDC. AT TDC, the magnetic exhaust valve MV is still closed due to the proximity of the magnet M1. This keeps the fluid pressure TFP in the cylinder pressure chamber PC still active and high. This pushes the piston retainer M1R to BDC. However, as the magnet M1 moves away from TDC, the internal fluid pressure FP overcomes the magnetic field attraction MF as it approached BDC and this opens the magnetic exhaust valve MV as ball valve BV also closes. The sudden pulse of the piston retainer M1R to BDC carries the magnetic field of the magnets M1 to repel the rotating magnets M2 and cause rotation. The cycle can only repeat if a new rotating magnet M2 aligns to push the magnet M1 to TDC. Advantageously, the system is synchronized to be repetitive according to the frequency of the rotations of the rotating magnets M2, whose rotation depend on the cycles of the magnets M1. The frequency of the magnets M2 can be multiplied to reduce redundancy time by simply adding more magnets M2 to the array.

The intake tube connects to a fluid F pressure tank which stores for example, a thermally expanded fluid TEF, such as, for example, steam and air.

The rotating magnets M2 have their magnetic fields MFL symmetric about the radial axis of their respective locations. In the foregoing, the polarity N indicates a North pole of a magnetic field, and the polarity S indicates the South pole of a magnetic field. The polarity of the outer radial surface of the rotating magnet M2 and the polarity of the inner radial surface of the magnets M1 must in general be opposite to repel each other. The general N, S polarity can be chosen as long as they are the same for both magnets. If an attraction force is required as for example, when a vacuum of negative pressure is used as a fluid, the polarities of M1 and M2 may be made opposites to attract.

Each of the circumferential array of radially spaced rotating magnets M2 are attached to a drive disc-member surface 301 and the drive disc-member 300 rotates on bearings B held by a stationary fixed shaft member 101. The rotating magnets M2, the piston retainers MIR, and their magnetic fields form symmetric arrays around the fixed center of the frame member 100 in radial directions, and the rotating magnets M2's magnetic fields can axially and radial align and misalign periodically during rotations with the piston retainers MIR's magnetic fields. Advantageously, multiple diametrically parallel circumferential arrays of rotating magnets M2 can be placed coaxially to rotate with the same drive disc-member 300 about the same fixed shaft member S, in order to increase the power of the apparatus 10.

Figure 11:
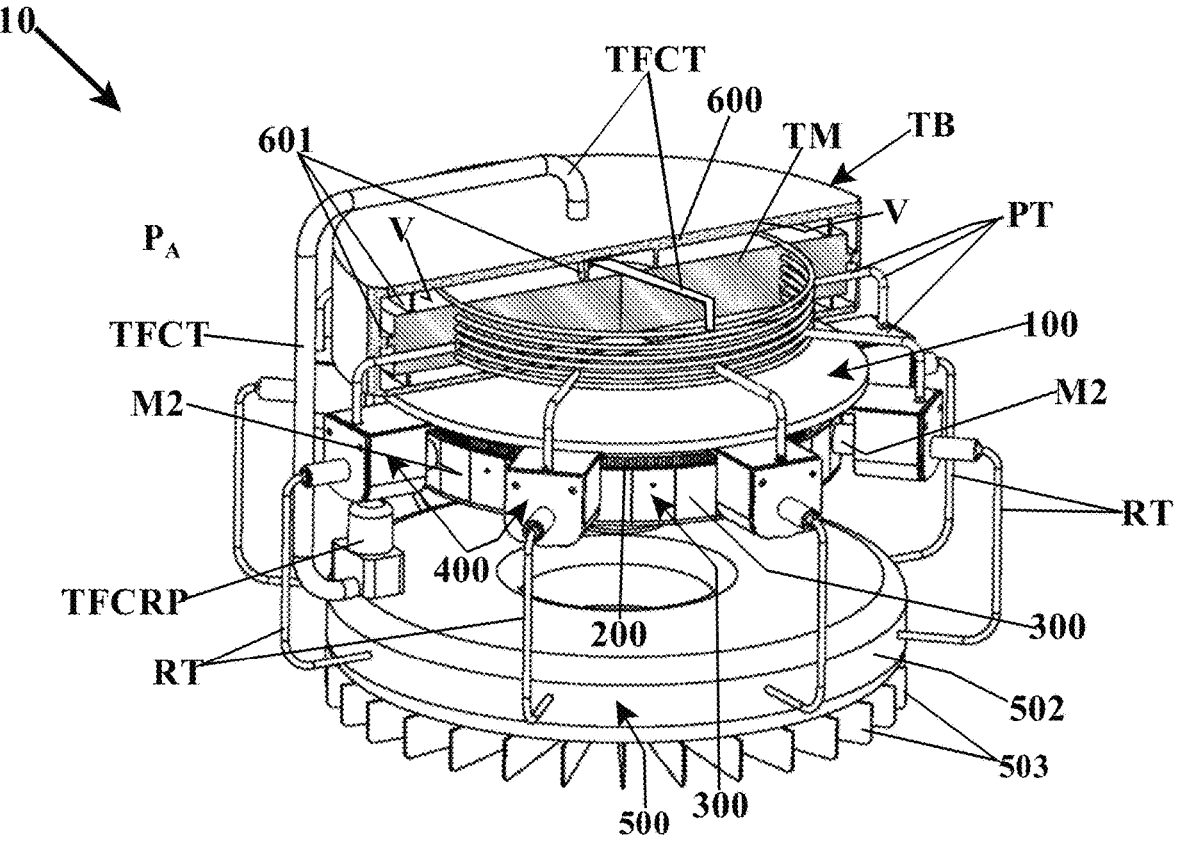
FIG. 11 shows the details of the thermal battery showing the thermal mas, the pressure tubes circulating to accept heat energy from the thermal mass within the thermal battery and their relation to the apparatus intake ports. The thermal mass is shown held in a vacuum chamber to prevent heat loss.
Figure 13:
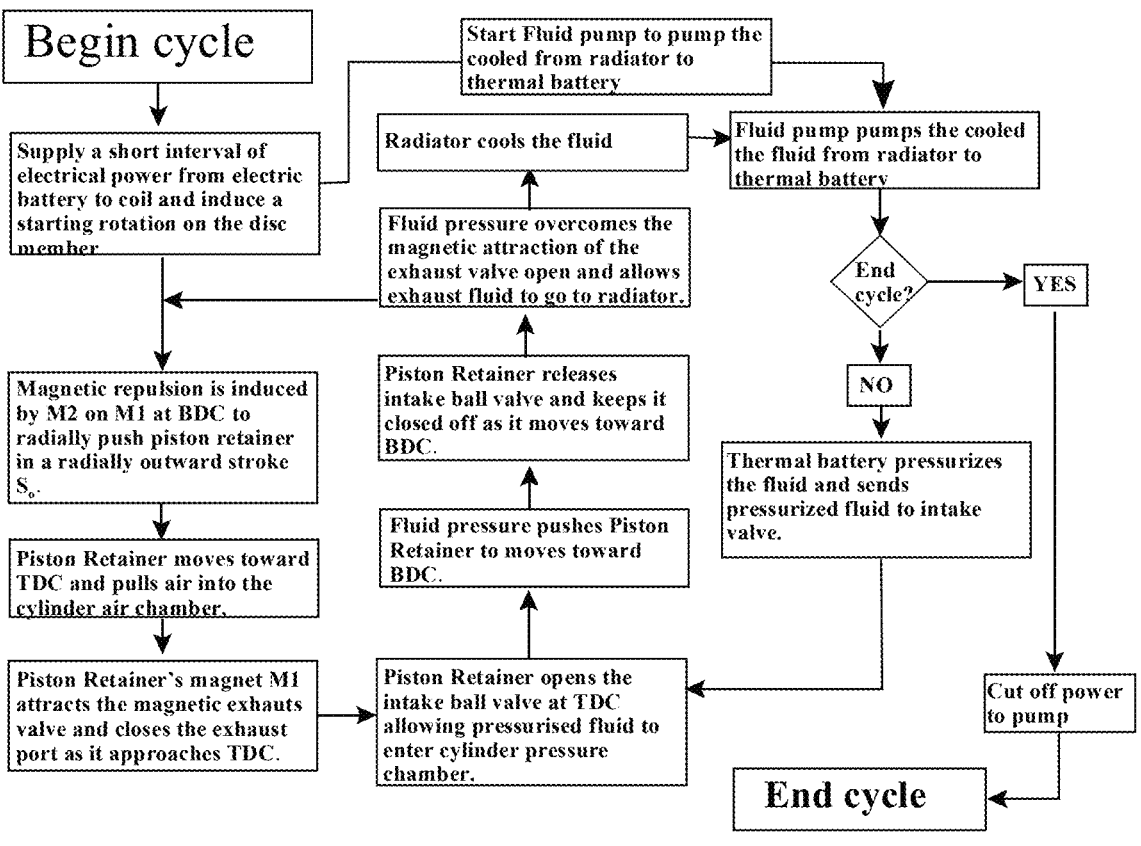
FIG. 13 is a flow diagram of the process of generating power from the apparatus.

The rotating magnets M2 and the rotating magnets M1, are spaced radially apart on the drive disc-member 300 to provide a free space to place an electric coil holder 200, that has a coil 202 wound around it in a circumferential spiral. This provided for the generating of an electric current from the coil 202 as the magnets M2 and the magnets M3 rotate around the coil 202. Advantageously, the apparatus 10 can generate an electric current and said electric current can be stored in an electric battery. Advantageously, the coil 202 can act as a means of starting the rotations of the apparatus 10. The current stored in the electric battery may be reused to start the induced rotation of the drive disc member 300 to start a power cycle as shown in FIG. 13. This can be achieved by simply supplying a momentary pulse of a starter current from the electric battery back to the coil 202 to induce a magnetic propulsion and rotation. The stored electrical power in the electric battery may also be used to power a thermal fluid condensate return pump TFCRP as shown in FIG. 11.

Advantageously, the stored electric energy can b used to drive the apparatus 10 by means of the coil 202. Hence not only does the coil 202 convert electric mechanical energy to stored chemical potential in an electric battery, it can also be used to drive the drive disc member 300 and generate mechanical power.

Figure 14:
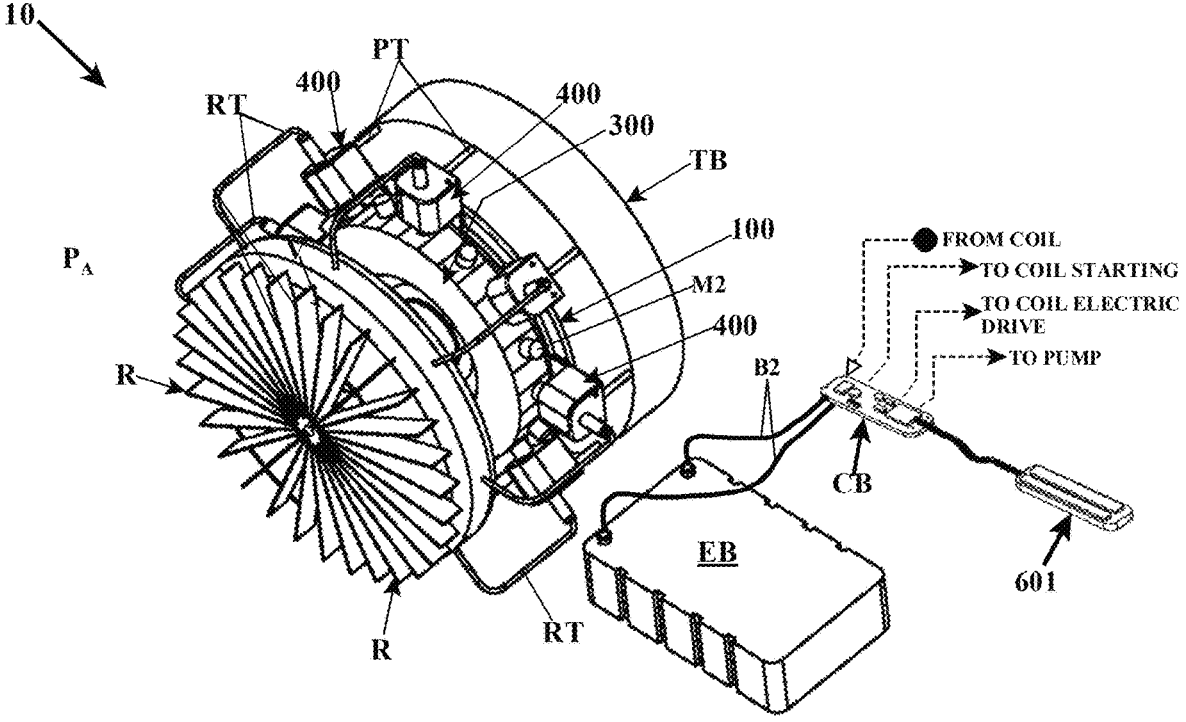
FIG. 14 shows the use of the apparatus as an electric storage and drive system using a battery and the coil. A circuit board is shown to switch from thermal drive to electric drive as needed.

Further, the conversion of thermal energy by the thermal battery TB to electrical energy with the coil 202 can allows the propulsion and drive mechanism to be a thermal powered motor and an electric powered motor. Advantageously, as shown in FIG. 14, the choice can be made as to which drive system to use by a simple circuit switch 600 that controls a circuit board CB. The apparatus 10 can then be used as a hybrid vehicle that is Thermo-magneto-electric.

Since each rotating magnet M2's magnetic-field MFL closest to a piston retainer M1R's magnetic field MFL is opposite to the piston retainer's magnetic field MFL, they will repel each other during their radial and circumferential encounters. Ideally, the power transmission can be maximized by synchronizing all the reciprocating actions of the piston retainers. One can imagine these fields are a radial pulsation of circumferential fields around the rotating magnets. The general principle of operation is to time the synchronicity of the radially inward circumferential stroke of the piston retainers' magnetic fields to just slightly angularly misalign in one angular direction of rotation, with the rotating magnetic fields, such that a repulsion rotates the drive disc member 300 in that rotation direction. Since each rotating magnetic field closest to a piston retainer's magnetic field is opposite to the piston retainer's magnetic field, they will repel each other during their misaligned radial and circumferential encounters.

Advantageously, the intake valve and the exhaust valve can also be electronically controlled to allow a variety of reciprocating magnetic fields to drive the drive disc member 300. For example, a repulsive pulse wave can be generated circumferentially to successively drive the drive disc member 300.

Advantageously the magnets have a magnetic North Pole (N) and a Magnetic South pole(S) with magnetic field lines symmetric about the axis of symmetry of each piston retainer. Preferably, the magnets M1 are cylindrical. Preferably, the polarity of the magnets M3 is opposite to the polarity of the magnets M2 such that the flux of magnetic field MFI crossing the coil 202 as they rotate will generate a continuous DC current since the rotary motion is continuous.

Depending on how the coil 201 is wound, the polarity of the magnets M1 and M2 are opposing each other, but the polarity of the magnets M3 can be either be opposite or alike.

It is now necessary to make sure that the radially inward polarity of the magnet M1 be opposite to the radially outward polarity of the magnet M2.

Advantageously, during this pressure forced transfer of energy and radially displacement of the piston retainers MIR, the magnetic field polarity of the magnets M1 (say N) comes closer to the N-polarity of all rotating magnets M2 in proximity to their respective radial angular location, and causes all rotatable rotating magnets M2 to be propelled and rotated away by the magnetic repulsions simultaneously. If there are x-rotating magnets M2, the total repulsion will be due to x-magnets simultaneously! This causes the drive disc-member 300 to rotate about the shaft member S, and the torque from all the magnetic field repulsions can be transmitted simultaneously to drive devices such as by a pulley or by mechanical drive connections.

Advantageously, the next cycle of pressurization in the cylinder pressure chamber PC occurs when the magnets M1 are momentarily resting at BDC and when an arriving rotating magnet repels its forcefully to the TDC position. These repulsive propulsions occur all around the drive disc-member 300 and they cumulatively provide large torque.

For example, if the magnetic fields can generate a repulsive force of 35 lbs at 8 separation, and the radius of the upper surface of the rotating magnets is at radius 1 foot, then, such a thermos-magnetic motor of the type herein described can generate at least 280-foot pounds of torque! The pressure required for a Unit square inch area of piston retainer surface will only be 35 psi. This is a very low fluid pressure FP that can be generated by simply heating humid atmospheric air as a fluid to about 800° F.

As shown in FIGS. 10 & 11, The apparatus 10 can be powered by a thermal battery TB. Thermal battery TB comprises a thermal mass such as metals, for example, Stainless Steel, Tungsten, Titanium, and other alloys of noble metals that do not rust. These metals must have high heat storage capacity. The thermal battery TB consists of a contiguous thermal battery vacuum case 600 within which is contained a sealed and insulated thermal mass TM under a vacuum V. The fluid F, passes through pressure tubes PT that enter and encircle within the thermal mass TM, and the fluid F is in thermal communication with the thermal mass TM. The fluid F as stated earlier, can be water, steam, refrigerants and even AIR and gases. As long as fluids F comprising gases can change their volumes by thermal processes as specified by Boyle's law, they can be used for the purposes of the invention.

A radiator R comprising of a simple heat exchange means is fluidly connected to the thermal mass via the exhaust return tube RT of the apparatus 10. A fluid condensate return pump TCRT connects a fluid condensate tube FCT to the thermal battery TB to allows condensate from the radiator to be pumped into the thermal battery TB. The fluid condensate return pump FCRT delivers a quantity of expansion fluid into the thermal mass TM for the fluid F to receive heat from the thermal mass TM causing thermal expansion fluid EF to expand into a vapor and become pressurized fluid PF. The thermal mass TM can heat the fluid and then transmit it under pressure to the intake tube PT that connects to the ball valve BV to allow the apparatus 10 to powered.

When the thermal mass TM of the Thermal battery is subjected to a heating means, such by solar energy, inductive heating, resistive heating and by radiation, it stores heat energy. This heat energy can then be used to power the apparatus 10.

Figure 12:
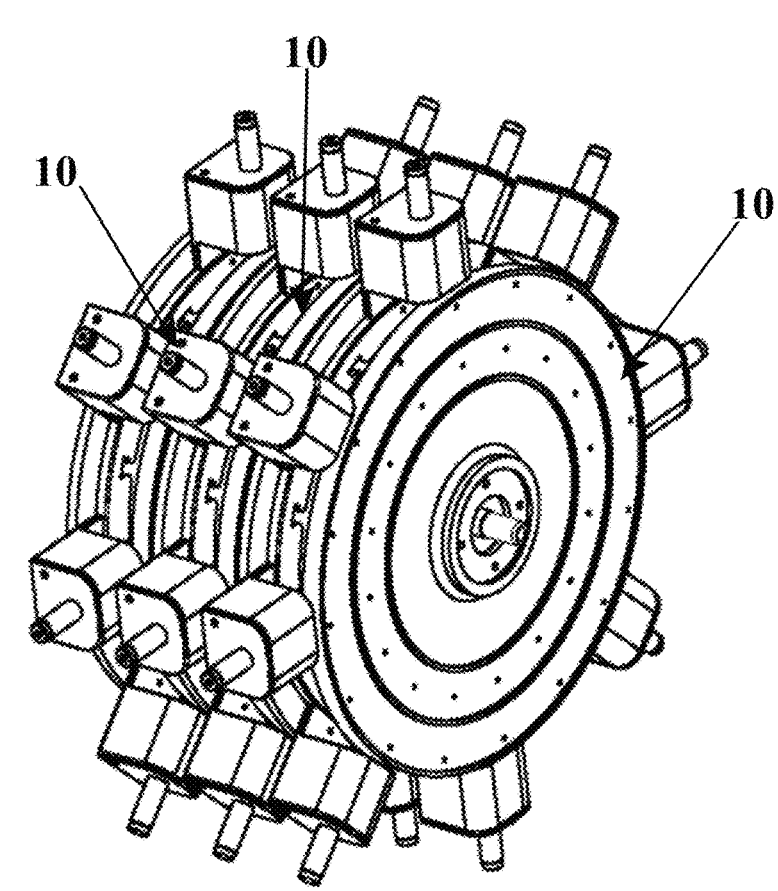
FIG. 12 shows how a multiplicity of components of the apparatus can be used to assemble a more powerful motor 20.

One can also imagine that the sequences of magnetic repulsion can be randomly spaced to provide for the same effective means of propulsion. Further, one can imagine that the radial and axial orientation of magnetic fields can be changed to suit the designer's wishes. FIG. 12 shows an apparatus 10 in which the orientations of the magnetic field axes are not radial but tangential. Further, the cylinder blocks 400 can be directly incorporated into the frame to save costs, however, for repair purposes it is best that they be separate entities.

Having described the basic components of the apparatus 10, the operation of the apparatus 10 is summarized hereunder. To start the apparatus 10 to generate power, electrical power is returned to the coil 202. The coil repels the magnets M2, and cause rotation of the drive disc member 300. The cycle of reciprocating motions of the piston retainer M1R then start. The rotations are generated as each sequential magnet M2 rotates to generate a repulsion of M1 to TDC. The fluid pressure FP as described earlier, then acts to bring the piston retainer back to BDC to repeat the cycle. Power is generated when the repulsion of the magnets M1 in a radially inward stroke S1 cause the entire process to repeat continuously and simultaneously for all the magnets M1 and the magnets M2. The process of power generation can be terminated when the thermal fluid F's condensate return pump TFCRP is cut off from battery B's power. The process can also be terminated by simply closing off the input to the thermal battery TB.

Figure 15:
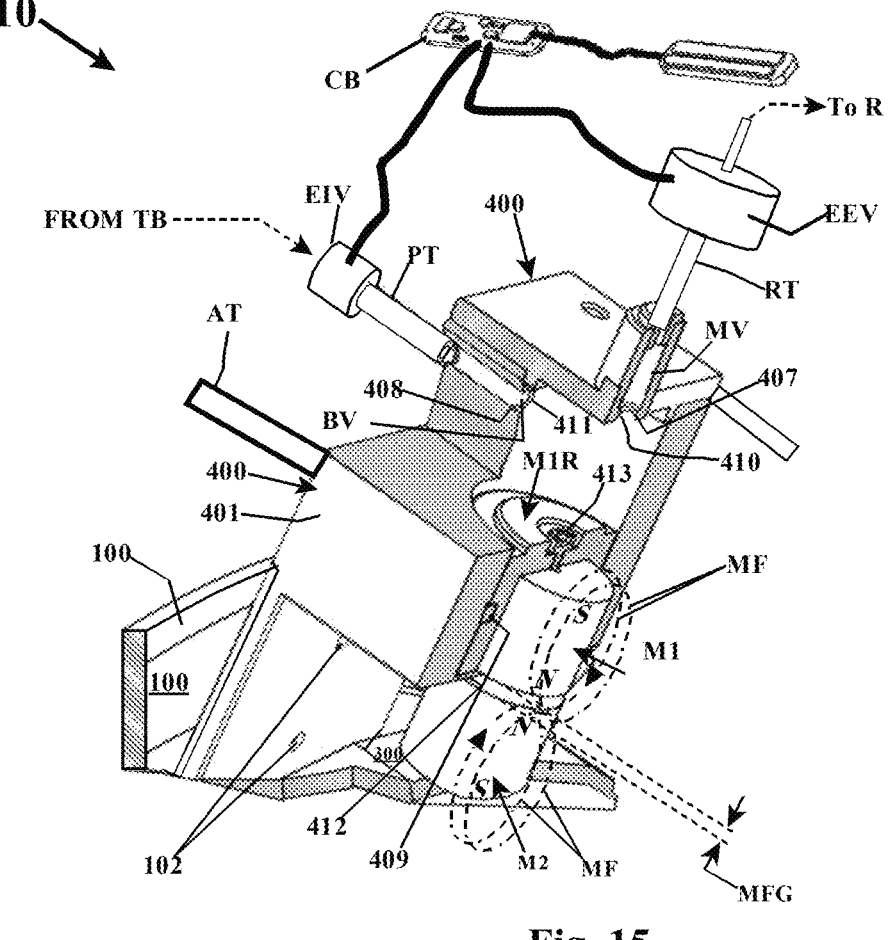
FIG. 15 shows the apparatus with electronic Exhaust and intake valves in place of mechanically and magnetically actuated valve. A control circuit board is shown to electronically control the operations of the apparatus.
Figure 16:
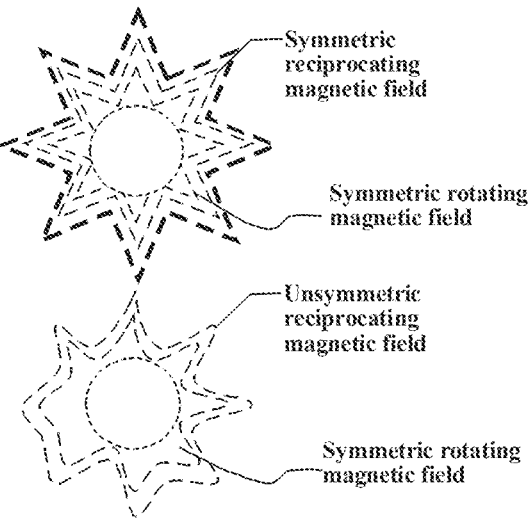
FIG. 16 shows examples of the oscillatory reciprocating motions of the piston retainer's magnetic field to cause a variety of different controlled motions of the drive disc member.

As shown in FIG. 15, the magnetic exhaust valve MV and the intake ball valve BV can be removed and replaced with electronically control exhaust valve EEV and an electronically controlled intake valve EIV, respectively. Advantageously, as shown in FIG. 15, the intake ball valve BV and the magnetic exhaust valve MV can be controlled by an augmented electronic circuit CC, instead of mechanically synchronizing them with the piston retainer M1R's motion. This allows the apparatus 10 to be capable of a variety of reciprocating magnetic fields MF to drive the drive disc member 300. For example, a circumferential repulsive magnetic pulse wave can be generated circumferentially to successively drive the drive disc member. As a further example, and as shown in FIG. 15, an electronic control means can be added to control the motion of the left side of the rotating magnets M2, and M3 which can be subjected to a clockwise rotation, while the right side of the rotating magnets M2, and M3 can be subjected to a braking force, such that the rotation speed of the drive disc member 300 can be accurately controlled the control circuit board CB. Advantageously, the apparatus 10 can be configured to oscillate at varying oscillation rotatory motions and forces.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. An energy conversion apparatus, comprising:
a stationary mounting structure;
a fixed shaft member mounted to said stationary mounting structure;
a rotatable disc-member mounted about said fixed shaft member;
a plurality of rotating magnets affixed to said rotatable disc-member, said rotating magnets being distributed circumferentially with uniform angular spacing;
a plurality of non-rotating cylinder block members each having a cylinder chamber and being affixed to said stationary mounting structure peripherally outwardly from said rotating magnets, forming a stationary circumferential array wherein said cylinder chambers align radially with said rotating magnets during rotation of said rotatable disc-member; a plurality of piston retainers, each slidably disposed within a respective cylinder chamber, permitting radial movement and holding a piston magnet;
a magnetic exhaust valve within each cylinder chamber, for controlling fluid exhaust through magnetic attraction forces between said piston magnet and said magnetic exhaust valve;
a spring-loaded intake valve configured to admit pressurized fluid into said cylinder chamber when pressure force within said chamber exceeds magnetic attraction forces holding said magnetic exhaust valve closed; and
a mechanism wherein the reciprocation of said piston magnet retainers generates a pulsing magnetic field interacting with said rotating magnets to induce rotation of said disc-member;
such that said apparatus is free of mechanical gearing, reducing energy losses associated with mechanical transmission.

2. The apparatus of claim 1, wherein each said piston magnet retainer is constrained to reciprocate radially between a top dead center position, where said magnetic exhaust valve is closed by magnetic attraction, and a bottom dead center position, where said magnetic exhaust valve is opened by fluid pressure.

3. The apparatus of claim 1, wherein said pressurized fluid is air heated above ambient by at least one of solar heating, thermal battery heating, geothermal heating, or mechanical compression and expansion processes.

4. The apparatus of claim 1, wherein said piston magnets reciprocate in cycles, and each cycle of reciprocation comprises:
said piston magnets being positioned at top dead center, the magnetic exhaust valve closes due to magnetic attraction from said piston magnet; and
said intake valve opening due to mechanical actuation;
at bottom dead center, whereupon said magnetic exhaust valve opens when pressure forces exceed magnetic attraction forces between the magnetic exhaust valve and the piston magnet, and the intake valve closing under spring tension;
wherein a repulsive magnetic force is generated between said rotating magnets and said piston magnets when said piston magnets move radially outward;
and wherein the rotational motion of said disc-member being sustained by sequential alignment and repulsion of said rotating magnets with reciprocating piston magnets.

5. The apparatus of claim 1, wherein magnetic repulsion between said reciprocating piston magnets and said rotating magnets applies a torque to said rotatable disc-member,
such that the magnitude of said torque is increased by at least one of:
increasing the number of rotating said magnets and corresponding reciprocating said piston magnets;
increasing the radial displacement between top dead center and bottom dead center; increasing the strength of the magnetic fields of said rotating magnets and said reciprocating piston magnets; and
increasing the pressure of said fluid used to drive said reciprocating piston magnets.

6. The apparatus of claim 1, additionally comprising an electric coil between each rotating said magnet, for generating an electrical current as said rotatable disc-member rotates.

7. The apparatus of claim 1, wherein the apparatus operates as a self-sustaining closed-cycle system utilizing the pressurized fluid as a recirculating heated fluid.

8. The apparatus of claim 1, wherein the reciprocating motion of said piston retainers and the rotation of said disc-member occur in resonance, optimizing energy efficiency.

9. The apparatus of claim 1, wherein the rotating magnets are free to rotate in either a clockwise direction or a counterclockwise direction depending on the initial alignment of repulsive forces.

10. The apparatus of claim 3, wherein the air heated above ambient is stored in a thermal battery for use as said pressurized fluid.

11. The apparatus of claim 1, wherein the apparatus has is scalable torque output by modifying the number and placement of rotating magnets and reciprocating piston retainers.

12. An energy conversion apparatus, comprising:
a stationary mounting structure;
a fixed shaft member mounted to said stationary mounting structure;
a rotatable disc-member mounted about said fixed shaft member;
a plurality of rotating magnet pairs affixed to said rotatable disc-member, said rotating magnet
pairs being distributed circumferentially with uniform angular spacing;
a plurality of non-rotating cylinder block members each having a cylinder chamber and being affixed to said stationary mounting structure peripherally outwardly from said rotating magnet pairs, forming a stationary circumferential array wherein said cylinder chambers align radially with said rotating magnet pairs during rotation of said rotatable disc-member;
a coil member affixed to said stationary mounting structure dispositioned between said rotating magnet pairs of magnets;
a plurality of piston retainers, each slidably disposed within a respective cylinder chamber, permitting radial movement and holding a piston magnet;

a magnetic exhaust valve within each cylinder chamber, for controlling fluid exhaust through magnetic attraction forces between said piston magnet and said magnetic exhaust valve;

a spring-loaded intake valve configured to admit pressurized fluid into said cylinder chamber when pressure force within said chamber exceeds magnetic attraction forces holding said magnetic exhaust valve closed; and a mechanism wherein the reciprocation of said piston retainers generates a pulsing magnetic field interacting with said rotating magnet pairs to induce rotation of said disc-member; and such that an electric current is produced by the flux of said rotating magnets acting upon said coil member;

such that said apparatus is free of mechanical gearing, reducing energy losses associated with mechanical transmission.

13. The apparatus of claim 12, wherein said coil member may be activated by an external current to activate rotation of said rotatable disc-member.

14. An energy conversion apparatus, comprising:

a stationary mounting structure;

a fixed shaft member mounted to said stationary mounting structure;

a rotatable disc-member mounted about said fixed shaft member;

at least one rotating magnet affixed to said rotatable disc-member;

at least one non-rotating cylinder block member each having a cylinder chamber and being affixed to said stationary mounting structure peripherally outwardly from said at least one rotating magnet, forming a stationary circumferential array wherein said cylinder chambers align radially with said at least one rotating magnet during rotation of said rotatable disc-member;

a plurality of piston retainers, each slidably disposed within a respective cylinder chamber, permitting radial movement and holding a piston magnet;

a magnetic exhaust valve within each cylinder chamber, for controlling fluid exhaust through magnetic attraction forces between said piston magnet and said magnetic exhaust valve;

a spring-loaded intake valve configured to admit pressurized fluid into said cylinder chamber when pressure force within said chamber exceeds magnetic attraction forces holding said magnetic exhaust valve closed; and a mechanism wherein the reciprocation of said piston magnet retainers generates a pulsing magnetic field interacting with said at least one rotating magnet to induce rotation of said disc-member;

such that said apparatus is free of mechanical gearing, reducing energy losses associated with mechanical transmission.

15. The apparatus of claim 14, wherein there are at least two rotating magnets, forming rotating magnet pairs, said rotating magnets being distributed circumferentially with uniform angular spacing.

* * * * *